United States Patent

Noguchi et al.

[11] Patent Number: 5,181,056
[45] Date of Patent: Jan. 19, 1993

[54] IMAGE STABILIZING APPARATUS

[75] Inventors: Kazuhiro Noguchi, Kawasaki; Shigeru Ogino, Tokyo; Takashi Kobayashi, Mitaka, all of Japan

[73] Assignee: Canon Kabushiki Kaisha, Tokyo, Japan

[21] Appl. No.: 706,955

[22] Filed: May 29, 1991

[30] Foreign Application Priority Data

May 31, 1990 [JP] Japan .................. 2-141955
May 31, 1990 [JP] Japan .................. 2-141956

[51] Int. Cl.⁵ .................................... G03B 39/00
[52] U.S. Cl. ............................ 354/70; 354/202; 359/554
[58] Field of Search .......... 354/65, 70, 195.1, 202; 358/222; 359/554, 557

[56] References Cited

U.S. PATENT DOCUMENTS 3,663,111 5/1972 Tsuda et al. .................. 359/554
3,845,929 11/1974 Reekie et al. .................. 359/554

Primary Examiner—L. T. Hix
Assistant Examiner—David M. Gray
Attorney, Agent, or Firm—Robin, Blecker, Daley & Driscoll

[57] ABSTRACT

An image stabilizing apparatus which compensates image blurring by means of a compensatory optical system displaceably supported relative to a barrel comprises an electrical locking device for electrically locking the compensatory optical system relative to the barrel, a mechanical locking device for mechanically locking the compensatory optical system relative to the barrel, and a control device for activating the electrical locking device prior to the activation or releasing of the mechanical locking device.

16 Claims, 18 Drawing Sheets

IMAGE STABILIZING APPARATUS

BACKGROUND OF THE INVENTION

1. Field of the Invention

The present invention relates to improvements in an image stabilizing apparatus for preventing an image from blurring due to the movement of hands or the like.

2. Related Background Art

Hitherto, there was known an optical apparatus having a function for preventing a picture image from blurring due to hand movement or the like. For example, an apparatus in which a compensatory optical system is movably disposed and picture images are prevented from blurring by the inertia thereof is disclosed in U.S. Pat. Nos. 2,959,088 and 2,829,557.

FIG. 19 shows the entire construction of an image stabilizing apparatus of such a type. In FIG. 19, lenses 1 and 2 constitute the compensatory optical system for compensating blurring of images formed on a focal plane 14 through main lenses 12 and 13 fixed to a lens barrel 4 (hereinafter referred to simply as a barrel). If the focal length of the lens 1 (fixed to the barrel 4 and with a negative power) is denoted as $f_1$; and that of the lens 2 (supported on a movable support member 3 and with a positive power) is denoted as $f_2$, then the focal length of the compensatory optical system is set in such a manner as to satisfy the following relationship: $f_1 = -f_2$.

The movable support member 3 is supported on the barrel 4 by means of a gimbal 5 for supporting two-shaft movement at a position of the focal length $f_2 (= -f_1)$ from the principal point on the image size of the lens 2.

FIG. 20 shows the construction in which the gimbal 5 is supported so as to be biaxially movable. The movable support member 3 for supporting the lens 2 is supported on a support member 5y having a freedom about the y axis; the support member 5y is supported on a support member 5x having a freedom about the x axis which is perpendicular to the y axis; and the support member 5x is supported on the barrel 4. Thus, a compensatory optical system having two shafts freely rotatable is constructed.

In FIG. 19, reference numeral 10 denotes a counter weight employed as a balancer for balancing the movable support member 3. The counter weight 10 is mounted on the movable support member 3 towards the end opposite to the lens 2 with the gimbal 5 being grasped therebetween, so that the gimbal 5 balances with the lens 2.

The above construction will realize a stabilization optical system of a so-called inertia pendulum optical system. That is, according to the construction of FIG. 19, image blurring can be prevented as described below.

For example, assuming that the construction shown in FIG. 19 is a telescope, an optical image of an object is formed inside the barrel 4 directed to an object on the focal plane 14 by means of the main lenses 12 and 13, and the compensatory optical systems 1 and 2. In a telescope with high magnifying power, vibrations having frequency components in the range of approximately 0.1 to 10 Hz occur in the barrel 4 due to, in particular, the vibration of a hand or the like when the telescope is held by hand. These vibrations cause image blurs.

However, with this vibration in the above-mentioned optical mechanism, a relative displacement occurs between the lens 2 and the lens 1 due to the inertia of the movable support member 3, thus suppressing the above-mentioned image blurring.

In FIG. 19, a member 9 mounted on the movable support member 3 is a non-magnetic conductor, such as an aluminum piece or the like. The magnetic effect formed by magnets 6 and 7 fixed to the barrel 4 produces a damping force on the basis of the vibration speed of the barrel 4. This is for the purpose of producing a damping action for preventing the movable support member 3 from striking the inner wall of the barrel 4, for example, when the barrel 4 is abruptly displaced in order to change the scene viewed.

Specifically, a damping effect is obtained by producing a force in a direction in which the eddy current generated by the conductor 9 makes the amount of the displacement of the movable support member 3 from the movable central position at which the optical axis of the lens 2 coincide with the optical axis (a main optical axis 15) of the main lenses 12 and 13.

In FIG. 21, the magnets 6 and 7 are mounted only on the upper section of the barrel 4. This is an omission for purpose of convenience only. Needless to say, similar magnets are disposed on the lower section, on the right and left of the barrel 4, for effectuating biaxial control.

In FIG. 19, reference numeral 11 denotes a magnetic substance integrally mounted along with the counter weight 10 on the movable support member 3. The magnetic substance performs a centering operation for returning the movable support member 3 to the central position of the movement at which the optical axis of the lens 2 coincides with the main optical axis 15 due to the magnetic effect formed between the magnetic substance and a magnet 8 fixed to the barrel 4. This centering operation is performed to make the optical axis of the lens 2 coincide with the main optical axis 15 by removing the displacement corresponding to the components of the direct current by using manufacturing errors and the frequency components of the above displacement. As a result, excellent optical characteristics can be obtained if the central section of the lens 2 is used when there is no blurring.

To be specific, as is shown in the enlarged view of the magnet 8 in FIG. 21, the same magnetic poles (both are N poles) of the magnetic substance 11 and the magnet 8 face each other so as to magnetically repulse each other. The center of the magnet 8 coincides with the main optical axis 15, with the result that the centering force is generated to make the optical axis of the lens 2 coincide with the main optical axis 15. With a damping and centering arrangement as described above, stabilization characteristics can be improved.

In the above-mentioned apparatus, the compensatory optical system (the movable support member 3) is very easy to move relative to the barrel 4. For this reason, if a large impact is applied to the apparatus while the apparatus (or equipment in which the apparatus is incorporated) is being transported, the movable support member 3 will violently strike the barrel 4 and be deformed. Hence, the stabilization characteristics deteriorate.

As a measure for preventing this deterioration, when the apparatus is not in use, generally, the state of the mechanical fixing means is changed by using a motor or the like and the movable support member 3 is fixed at the central position of the movement.

However, when the fixation of the movable support member 3 by means of the fixing means is released while the apparatus is held, for example, in a state in which the amount of the displacement of the movable support member 3 becomes very large, the movable support member 3 sometimes greatly deviates and strikes the barrel 4. Also, in a case where the state of the fixing means is abruptly changed in order to fix the movable support member 3 when the amount of the displacement of the movable support member 3 in a non-fixed state is large, an excessive force is applied to a driving means for driving the fixing means. This presents the problem that damage or deformation is caused to these components. As a result, another problem arises in that a picture image which is distorted and of poor quality is produced.

SUMMARY OF THE INVENTION

The present invention has been devised in light of the above-mentioned circumstances. It is accordingly an object of the present invention to provide an image stabilizing apparatus that compensates image blurring by using a compensatory optical means displaceably supported relative to a barrel, which apparatus comprises an electrical locking means for electrically locking the compensatory optical means relative to the barrel, a mechanical locking means for mechanically locking the compensatory optical means relative to the barrel, and a control means for operating the electrical locking means prior to the activation or the releasing of the mechanical locking means, and for preventing the components of the apparatus from being damaged or deformed, and preventing the picture image from being distorted when the compensatory optical system is locked or the locking thereof is released.

These and other objects, features and advantages of the present invention will become clear when reference is made to the following description of the preferred embodiments of the present invention, together with reference to the accompanying drawings.

DETAILED DESCRIPTION OF THE PREFERRED EMBODIMENTS

The embodiments of the present invention will be explained below in detail with reference to the accompanying drawings.

Figure 4:
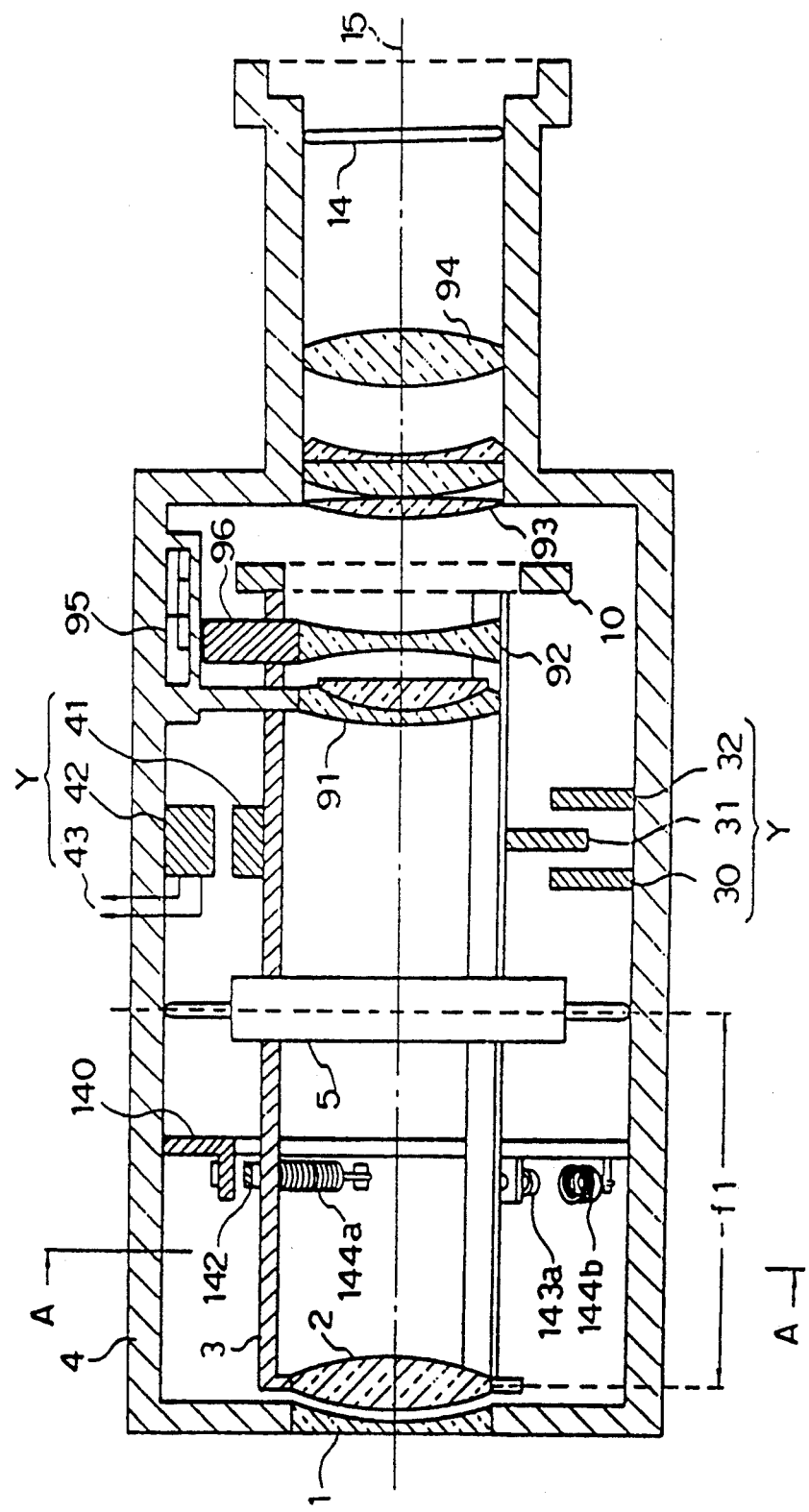
FIG. 4 is a cross-sectional view showing the image stabilizing apparatus of an embodiment of the present invention.
Figure 5:
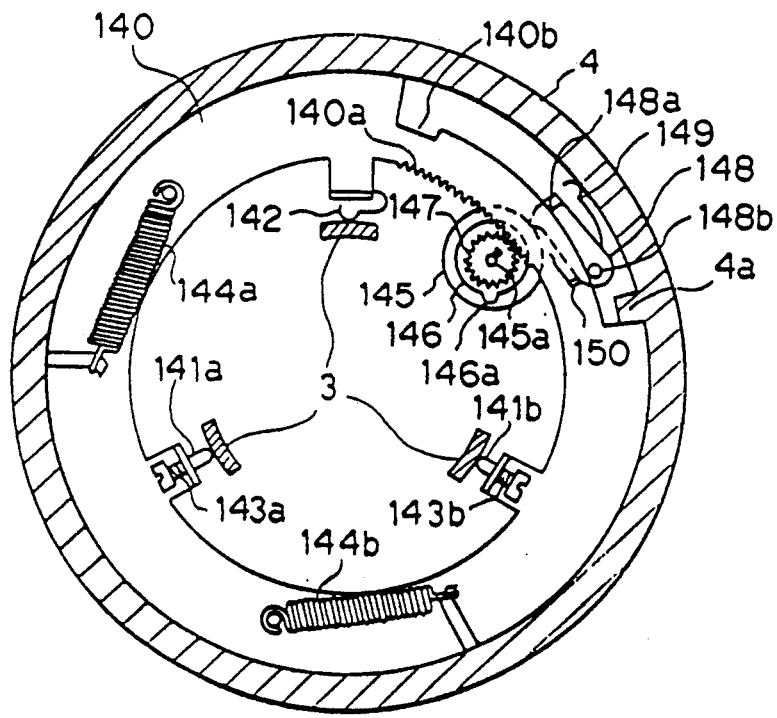
FIGS. 5 and 6 are cross-sectional views taken along the line A—A.
Figure 6:
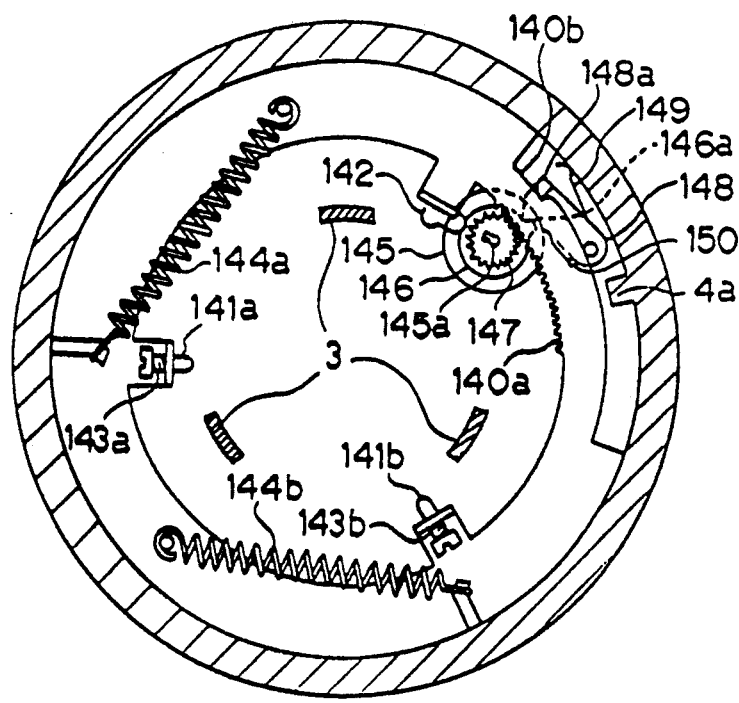
Figure 19:
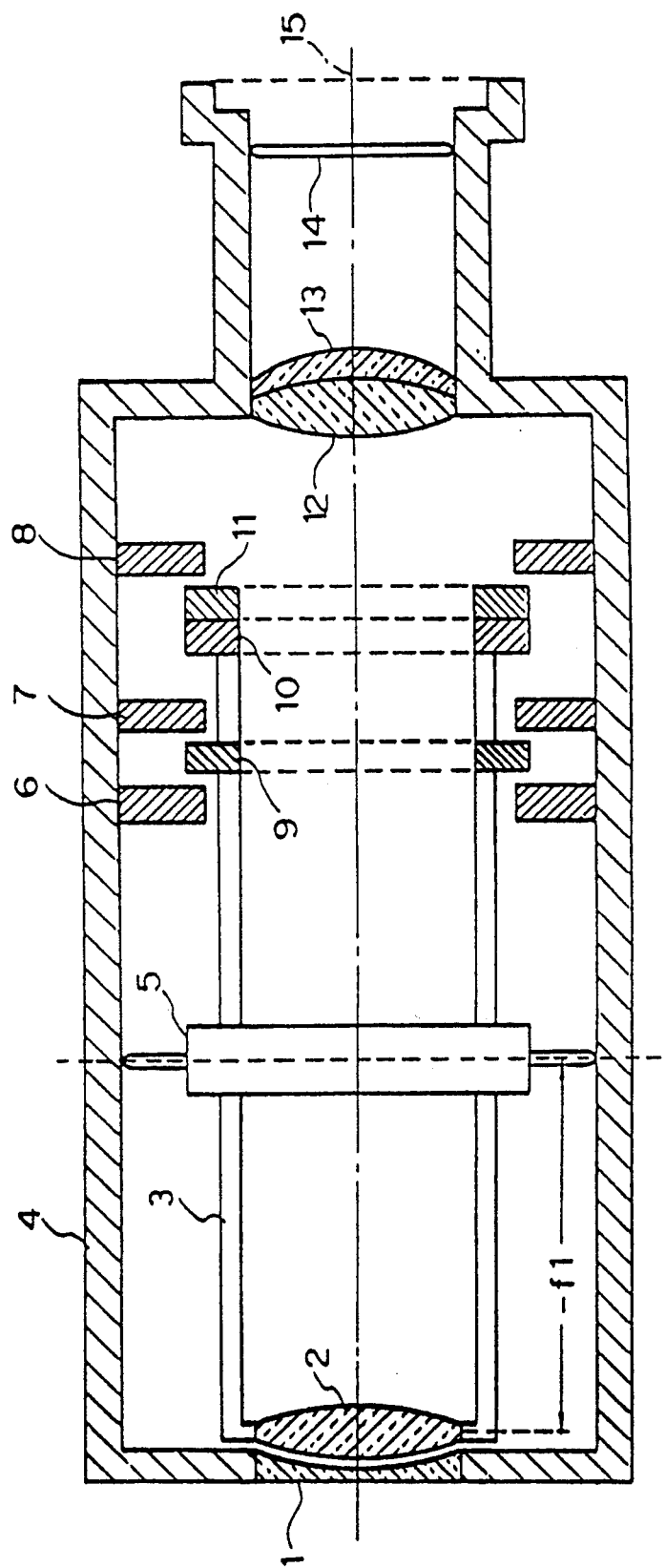
FIG. 19 is a cross-sectional view showing the construction of a conventional image stabilizing apparatus.
Figure 20:
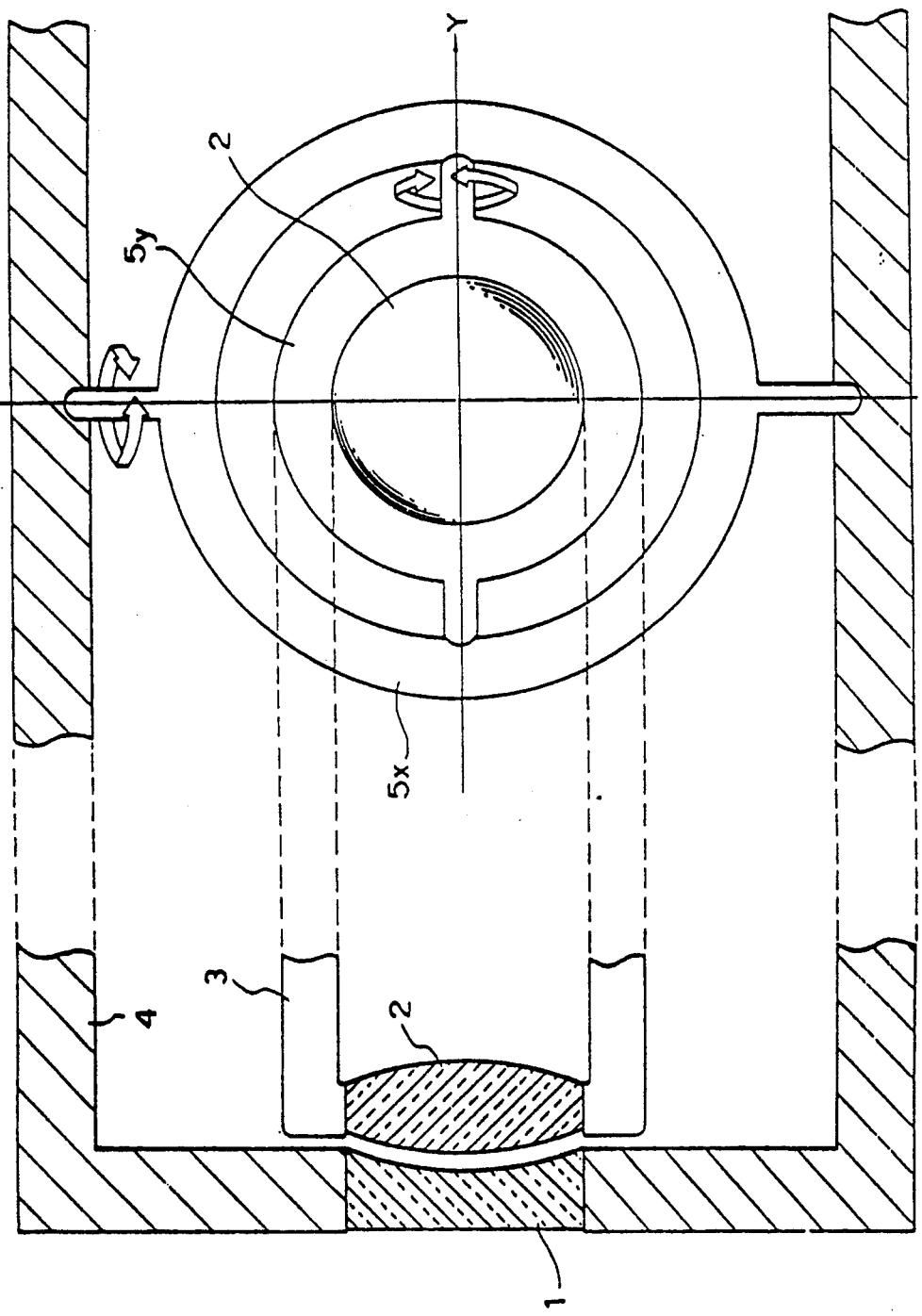
FIG. 20 is a partially enlarged view showing the construction supported by a gimbal of FIG. 19.
Figure 21:
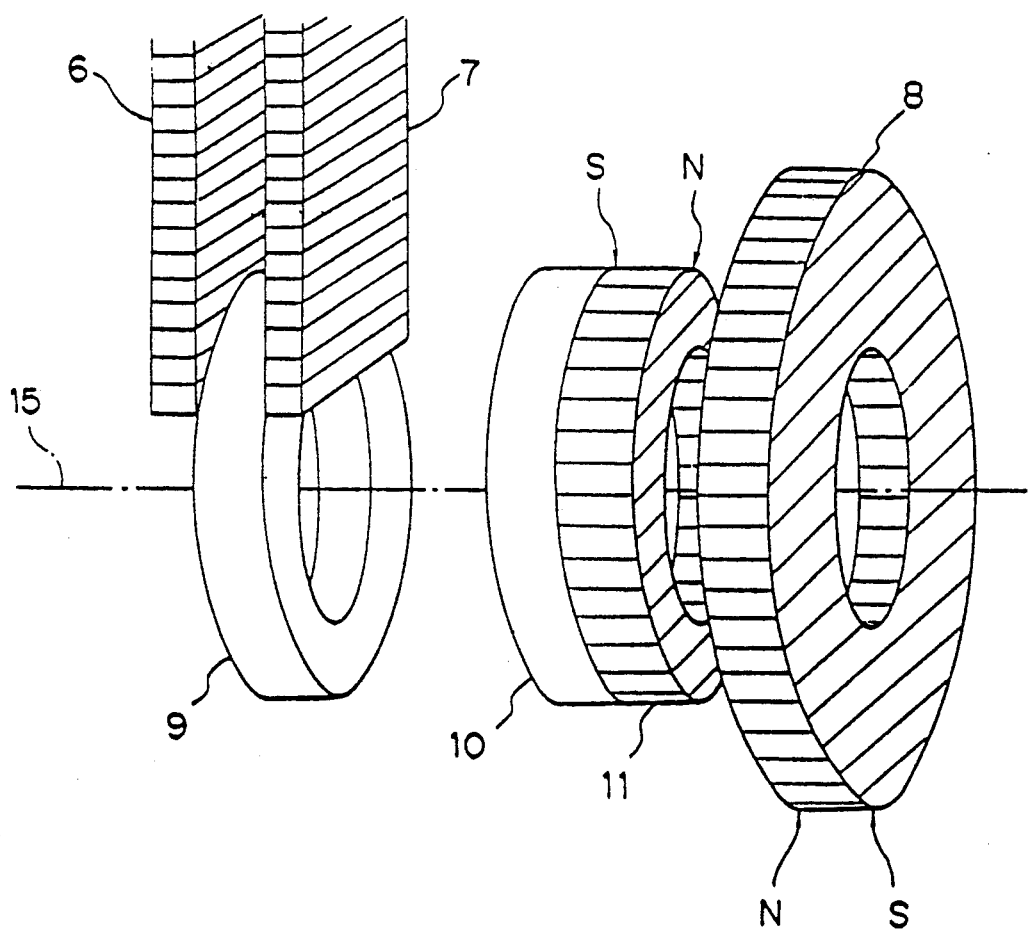
FIG. 21 is a partially enlarged view showing the construction of FIG. 19.

FIGS. 4 to 6 each show the construction of an image stabilizing apparatus of an embodiment of the present invention. This apparatus functions based on the inertia pendulum system which is the same as that of the image stabilizing apparatus shown in FIG. 19. The same reference numerals are used to indicate like elements in FIGS. 4 to 6 and FIG. 19, and a detailed explanation thereof is omitted.

In FIG. 4, the main photographing optical system is formed with a front lens 91, a variable power lens 92, and fixed image-forming lenses 93 and 94. The variable power lens 92 is disposed so as to be movable by means of a movable ring 96 in order to deal with changes in a focal length. The position to which the variable power lens 92 is moved can be detected by a variable power encoder (hereinafter referred to as an ENC) 95. The output of this ENC 95 determines what condition the focal length of the photographing optical system is in. FIG. 4 illustrates a 2-bit optical reflection representation of the ENC 95.

In FIGS. 4 to 6 (FIGS. 5 and 6 are cross-sectional views of FIG. 4 taken along the line A—A.), reference numeral 140 denotes a rotary member for temporarily locking the movable support member 3 to the barrel 4, which member has a gear 140a. Reference numerals 141a and 141b each denote a pin for determining the position where the movable support member 3 is locked, and the front end of the pin is in the shape of a spherical screw. The position where the movable support member is locked can be adjusted screwed amount by rotating pins 141a and 141b. The adjusted position is fixed by the energizing the springs 143a and 143b. Thus, optical performance in a locked condition can be enhanced. Reference numeral 142 denotes a plate spring for energizing the movable support member 3 to a position determined by pins 141a and 141b. Reference numerals 144a and 144b each denote a tension coil spring for energizing the rotary member 140 in a counterclockwise direction against the barrel 4. In FIG. 5, the rotary member 140 is brought into abutment with a stopper 4a, and the movable support member 3 is in a locked state. Reference numeral 145 denotes a motor for causing the rotary member 140 to rotate; reference numeral 146 denotes a disc having a projection section 146 around the outer periphery thereof, which disc is fixed to the output shaft 145a of a motor 145; reference numeral 147 denotes a gear which engages with a gear 140a and is fixed rotatably within a limited angle to the output shaft 145a of the motor 145; reference numeral 148 denotes a locking member for locking the rotary member 140 to a position where the movable support member 3 is unlocked; reference numeral 149 denotes a plate spring for energizing the locking member 148; and reference numeral 150 denotes a switch which is switched on or off by the motion of the locking member 148 and outputs a status signal indicating whether it is locked or unlocked (turns on when the locking is released).

In FIG. 4, a sensor system (30, 31, and 32) is disposed in the inner wall of the barrel 4 and in the movable support member 3. A torque generation system (41, 42, and 43) is disposed in a section symmetric with respect to the axis of the barrel 4. The x axis and the y axis are constructed similarly, and the x axis is positioned perpendicularly to the y axis.

Figure 9:
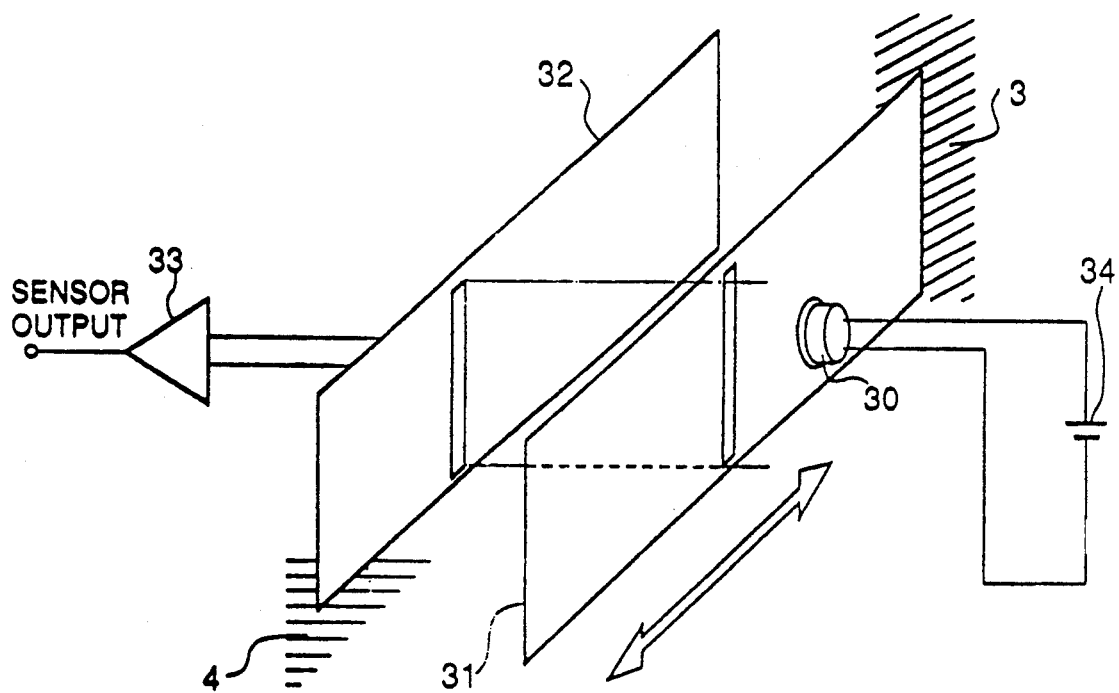
FIG. 9 is a perspective view showing an example of a specific construction of a sensor system shown in FIG. 4.

The construction of the above-mentioned sensor system is shown in FIG. 9. This system comprises a light-emitting device 30, such as an LED, mounted on the inner wall of the barrel 4, a power supply 34 for the light-emitting device 30, a one-dimensional light-receiving position detection device 32, such as a PSD, for receiving the light from the light-emitting device 30, and a slit curtain 31 mounted on the movable support member 3.

The slit curtain 31 disposed between the light-emitting device 30 and the one-dimensional light-receiving position detection device 32 moves in the direction of the arrow in the figure together with the movable support member 3 holding the lens 2, which is a compensatory optical system. Therefore, a signal on the basis of the deviation angle thereof is detected by the light-receiving position detection device 32. The signal is output from a sensor amplifier 33 as a signal indicating the displacement of the movable support member 3 relative to the barrel 4.

Figure 10:
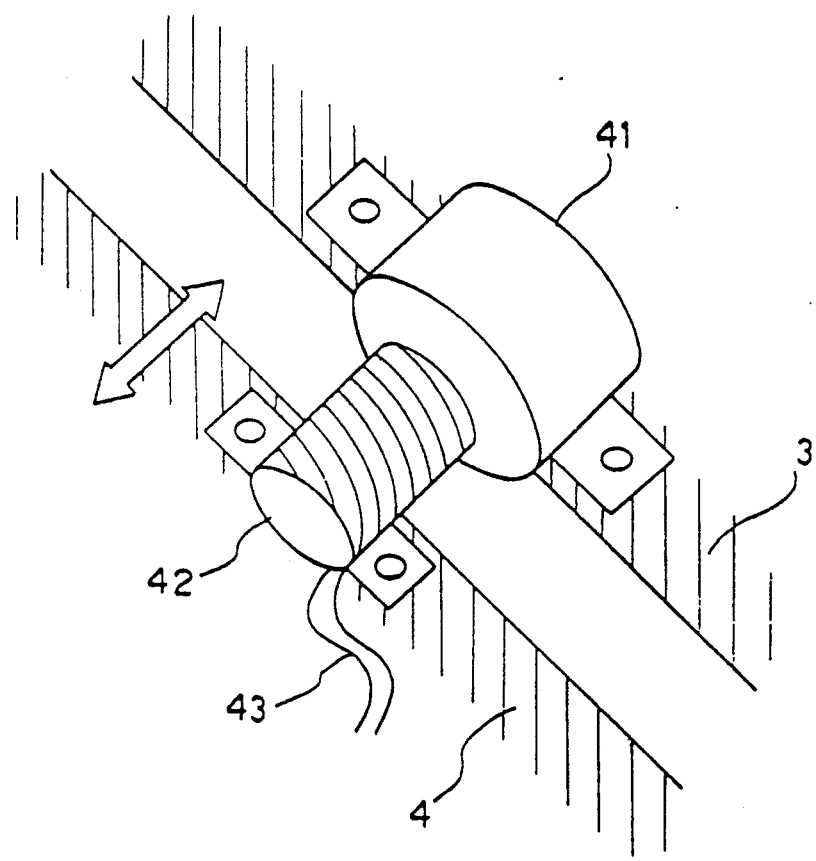
FIG. 10 is a perspective view showing an example of a specific construction of a torque generation system shown in FIG. 4.

In FIG. 10, an example is shown in which the above-mentioned torque generation system is formed by a voice type coil. This system comprises a voice coil 42 mounted on the inner wall of the barrel 4 and a magnet 41 mounted on the movable support member 3.

When a control signal is input to an input terminal 43, a magnetic coupling force (or a magnetic repulsion force) is generated between the voice coil 42 and the magnet 41 depending on the amount and the polarity of the current, causing a torque to be generated in the direction of the arrow shown in FIG. 10.

As described above, the sensor system (30, 31, and 32) and the torque generation system (41, 42, and 43) are disposed in such a manner that the x axis and the y axis intersect each other perpendicularly. Coupled with gimbal support, a torque about the x axis and the y axis for the movable support member 3 can be controlled so that damping and centering are performed on the movement of the movable support member 3.

Figure 3:
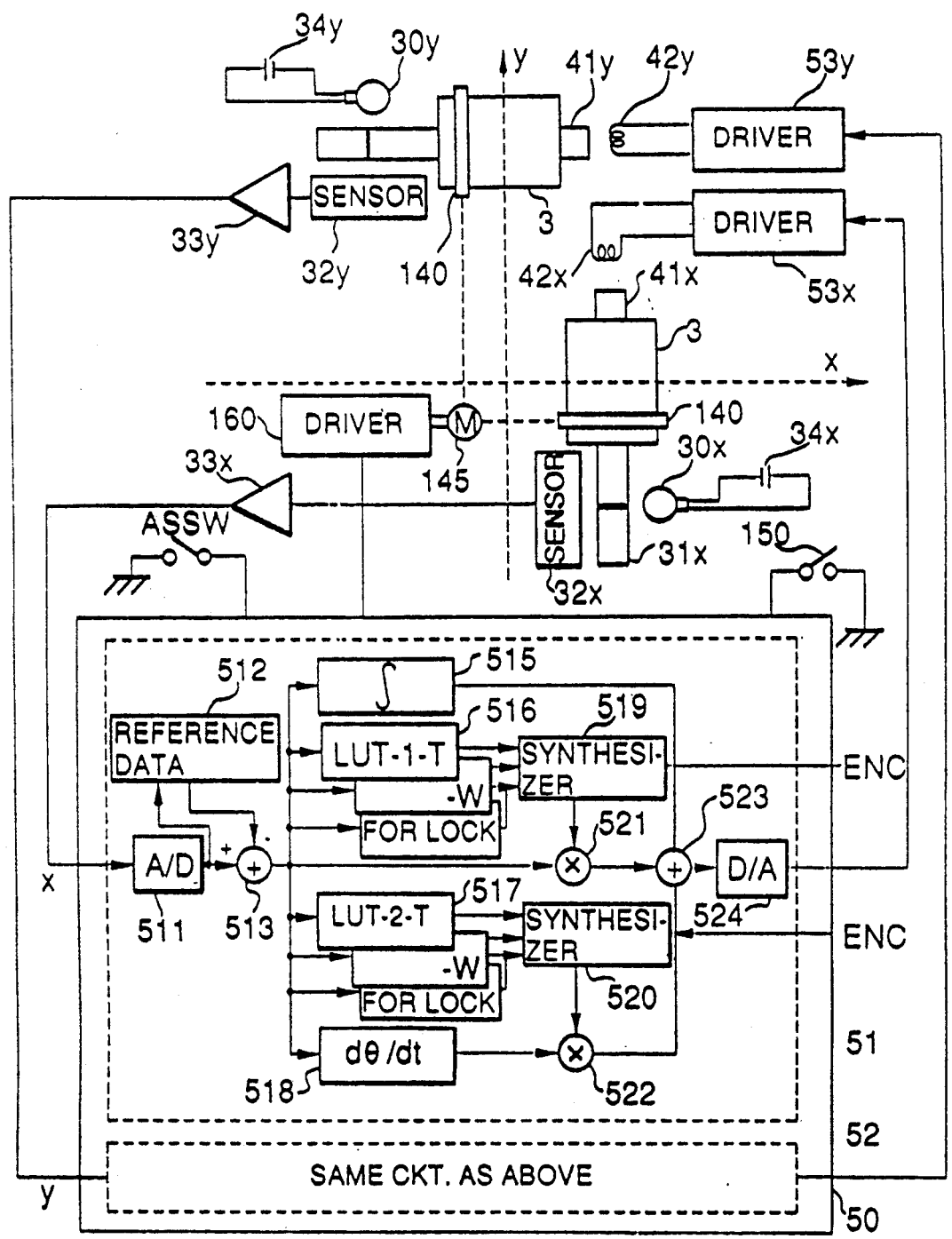
FIG. 3 is a view showing the control system of an image stabilizing apparatus shown in FIG. 4.

FIG. 3 is a block diagram showing a control system which inputs the output of the sensor amplifier 33, controls the driving of the voice coil 42 in proportion to the displacement of the movable support member 3 relative to the barrel 4 and performs torque control for the movable support member 3 about the x and y axes.

In FIG. 3, a signal indicating the displacement of the movable support member 3 relative to the barrel 4 from the sensor amplifier 33 for the movable support member 3 about the x and y axes is converted into digital data by an A/D converter 511 within a control circuit 50 formed of a microcomputer or the like. In FIG. 3, the sensor system for the movable support member 3 about the x axis is designated by 30x, 31x, 32x, 33x, and 34x, and the sensor system for the movable support member 3 about the y axis is designated by 30y, 31y, 32y, 33y, and 34y. The difference between the digital data and reference data (the position of the movable support member 3 during a locked state deviates due to temperature drifts of circuits and positional deviation of each member, that is, the displacement amount [deviation angle $\theta$] is no longer "0") on the one hand a reference data holder 512 which holds the position signal (output of the sensor amplifier 33) of the movable support member 3 during a locked state on the other hand, is determined by an adder 513. The difference is output to subsequent circuits.

As will be described later, the signal which has been converted from analog to digital data and processed is converted into analog data and output from the control circuit 50. The driving of the torque generation system 41 and 42 (in FIG. 3, systems for the movable support member 3 about the x axis are designated by 41x and 42x, and those for the movable support member 3 about the y axis are designated by 41y and 42y.) is controlled by means of driving circuits 53x and 53y on the basis of the analog data.

The basics of stabilization control by the control circuit 50 are as follows: in order to satisfy two contradictory elements of stabilization and excessive motion of the lens section regarding panning and tilting, a non-linear control torque for damping and centering is generated in the torque generation system 41x, 42x and 41y, 42y concerning the displacement of the movable support member 3 which is an inertia pendulum relative to the barrel 4.

Figure 11:
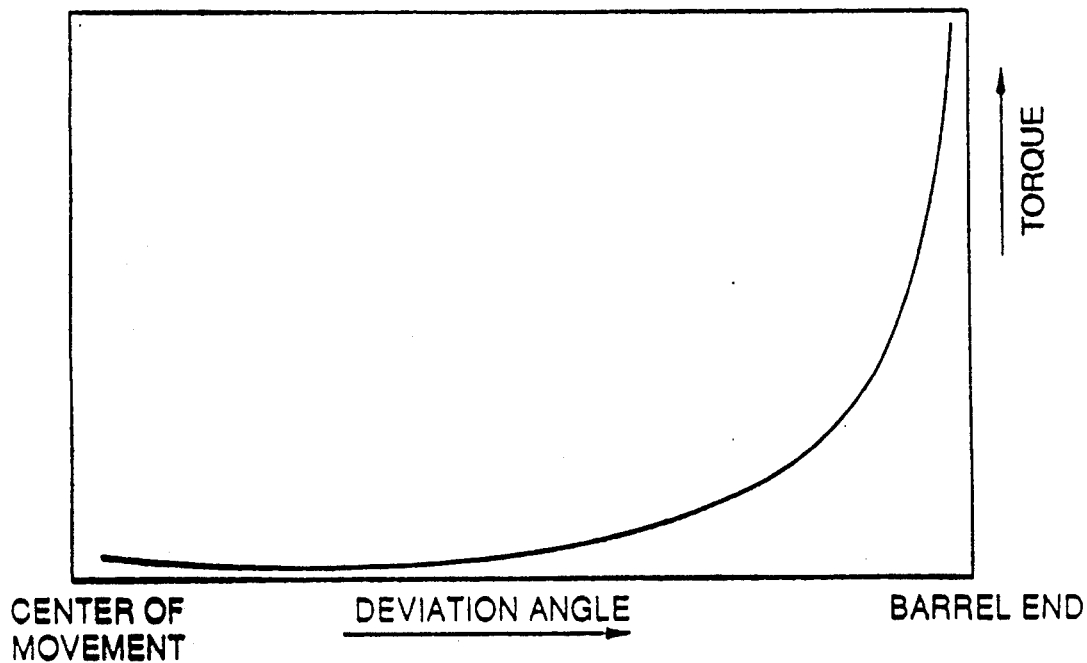
FIG. 11 is a control torque characteristic view fundamental to the control system of FIG. 3.

A characteristic example of this control torque is shown in FIG. 11. According to the characteristics of the control torque shown in FIG. 11, when the movable support member 3 is positioned in the vicinity of the center of movement, a torque for damping is barely generated in the torque generation system 41x, 42x and 41y, 42y so that the stabilization action by the inertia pendulum will not be blocked.

When the movable support member 3 deviates from the center of movement due to the action of the inertia pendulum as the barrel 4 is moved in a certain direction as in panning (the barrel 4 is moved side to side to change the scene viewed) or in tilting (the barrel 4 is moved up or down to change the scene viewed), centering and damping forces, which increase sharply to return the movable support member 3 to the center of movement, are generated in the torque generation system 41x, 42x, and 41y, 42y as the amount of the displacement of the movable support member 3 becomes larger so that the movable support member 3 is prevented from striking the inner wall of the barrel 4.

Figure 12:
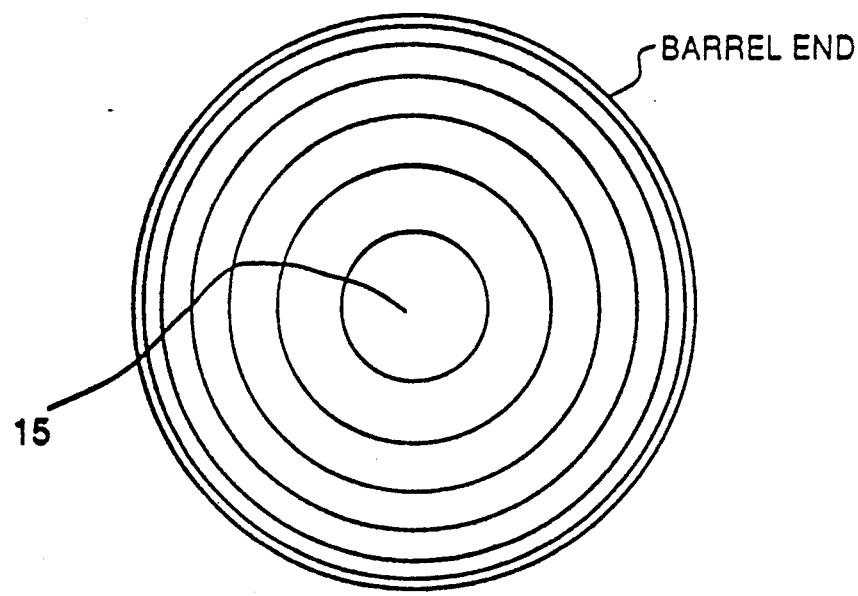
FIG. 12 is an image view showing a case in which the control torque of FIG. 11 is seen from the main optical axis side.

If the torque curve of FIG. 11 is seen from the direction of the main optical axis 15 of the pendulum, it becomes an image as shown in FIG. 12. It can be seen that, since one concentric circle denotes a fixed amount, the intervals of the concentric circles become dense as the circle comes close to the outer periphery, i.e., the end of the barrel 4. That is, the movable support member 3 deviates from the center of movement, the inclination of the torque characteristics becomes sharp. FIG. 12 shows the situation in which the torque increases in the form of a non-linear curve shown in FIG. 11.

By controlling centering and damping torques in this manner, the movable support member 3 is prevented from striking the barrel 4 by maximizing the centering and damping actions when the movable support member 3 comes close to the barrel 4. Other than that, these centering and damping actions are minimized so to that the stabilization action by the inertia pendulum will not be blocked.

To realize the control characteristics in FIG. 11, in the control circuit 50, coefficients $K_1$ and $K_2$ by which the torque curve of FIG. 11 can be obtained are selected from look-up tables (hereinafter referred to as an LUT) 516 and 517 stored within the control circuit 50, for example, on the basis of the amount of the displacement (a deviation angle $\theta$) inputted from sensor amplifiers 33x and 33y. A control function is computed as shown below:

$$DATA = K_1 * \theta + K_2 * d\theta/dt + K_3 * \int \theta dt$$

where the coefficient $K_3$ is a small fixed value, and * means multiplication. This DATA is generated as a control torque in the torque generation system 41x, 42x, and 41y, 42y.

In the above control function, the term "$K_1 * \theta$" can be determined by using the LUT 516, a synthesizer 519, and a multiplier 521, all of which are shown in FIG. 3. This term acts as a spring term for generating a centering force on the basis of the amount of the displacement of the movable support member 3 from the center of movement. The term "$K_2 * d\theta/dt$", which is a damping term, can be determined by using a LUT 517, a differentiator 518, a synthesizer 520, and a multiplier 522, all of which are shown in FIG. 3. This term has the effect of suppressing a sharp panning or tilting. The term "$K_3 * \int \theta dt$" for a centering operation can be determined by using an integrator 515. This term has the effect of cancelling errors which occur due to various kinds of factors, such as accumulative errors or manufacturing errors at the time of mass production, and so forth and for returning the movable support member 3 to the center of movement. Since such an integration operation sets the degree of influence on the control system, such non-linear processing as is performed for the other terms is not performed for this term.

The above-mentioned respective terms are added by the adder 523 shown in FIG. 3. They are converted into analog data by a D/A converter 524 at a subsequent stage. The converted analog data is then output to the torque generators 42x and 42y via driving circuits 53x and 53y.

Figure 13:
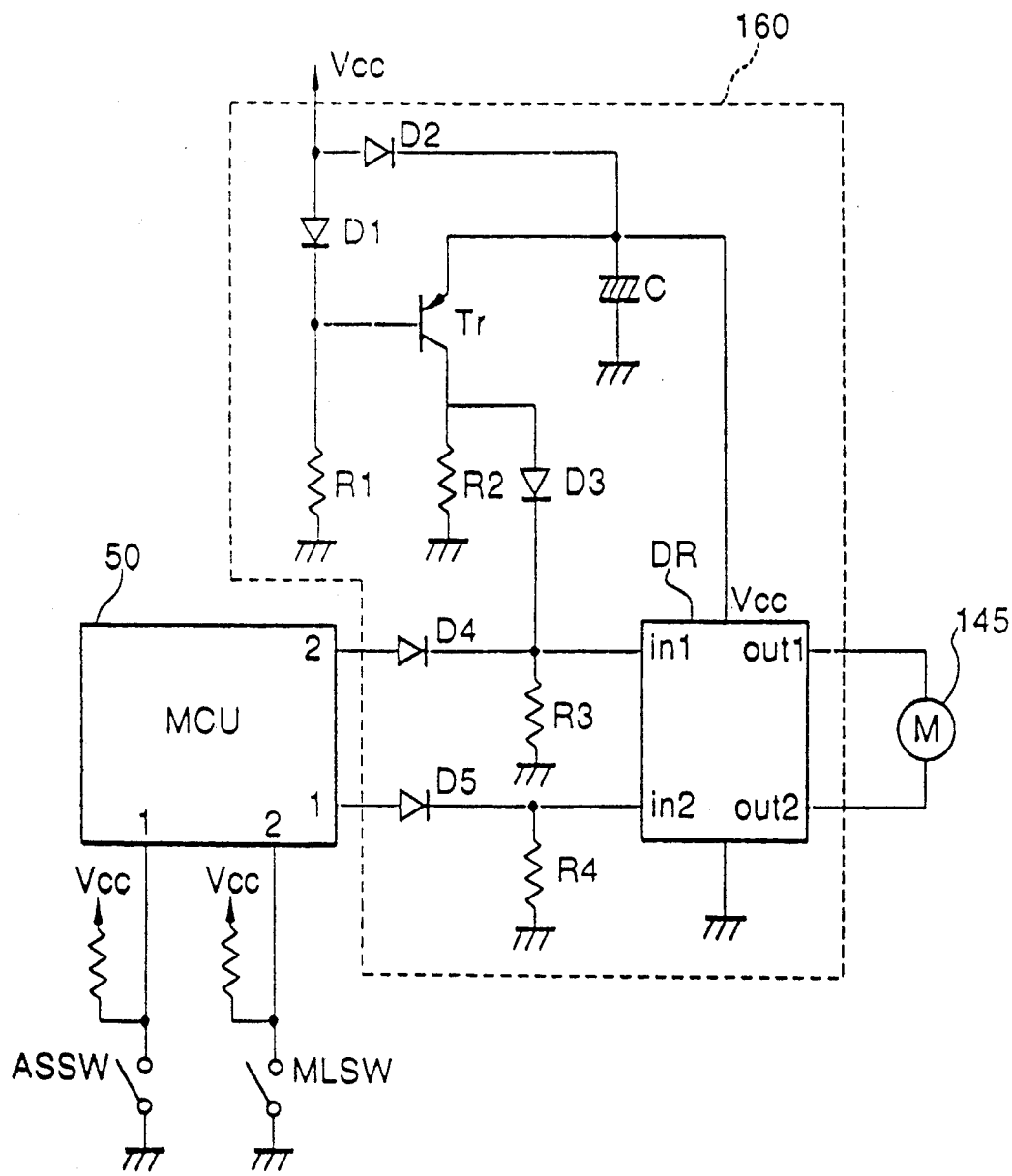
FIG. 13 is a detailed circuit diagram of a portion where the motor shown in FIG. 3 is controlled and driven.

The control circuit 50 controls the locking or unlocking of the movable support member 3 via a driving circuit 160 by using the motor 145. FIG. 13 is a circuit diagram showing the details of this portion. The driving circuit 160 comprises diodes D1 to D5, resistors R1 to R4, a transistor Tr which is turned on when the power supply (Vcc) is turned, off, a capacitor C having a small capacity for use as a backup power supply when the power supply disappears, and a driving section DR for controlling the driving of the motor 145.

In addition, the control circuit 50 also operates as an electrical fixing means at the time the movable support member 3 is locked or unlocked by a mechanical fixing means shown in FIGS. 5 and 6, as will be described later.

In FIGS. 3 and 13, reference character AS (auto stabilizer) SW denotes a switch for selecting whether a stabilization function will be made to function.

The components within the border defined by dotted lines 51 and 52 within the control circuit 50 in FIG. 3 are the same except for the coefficient data within the LUTs 516 and 517, the illustration of one of the sides (within the border of the dotted line 52) being omitted for simplification. In the section from the reference data holder 512 to the adder 523 among the components within the border of the dotted line 51, the contents of the processing by the control circuit 50 are shown in the form of hardware.

Figure 14:
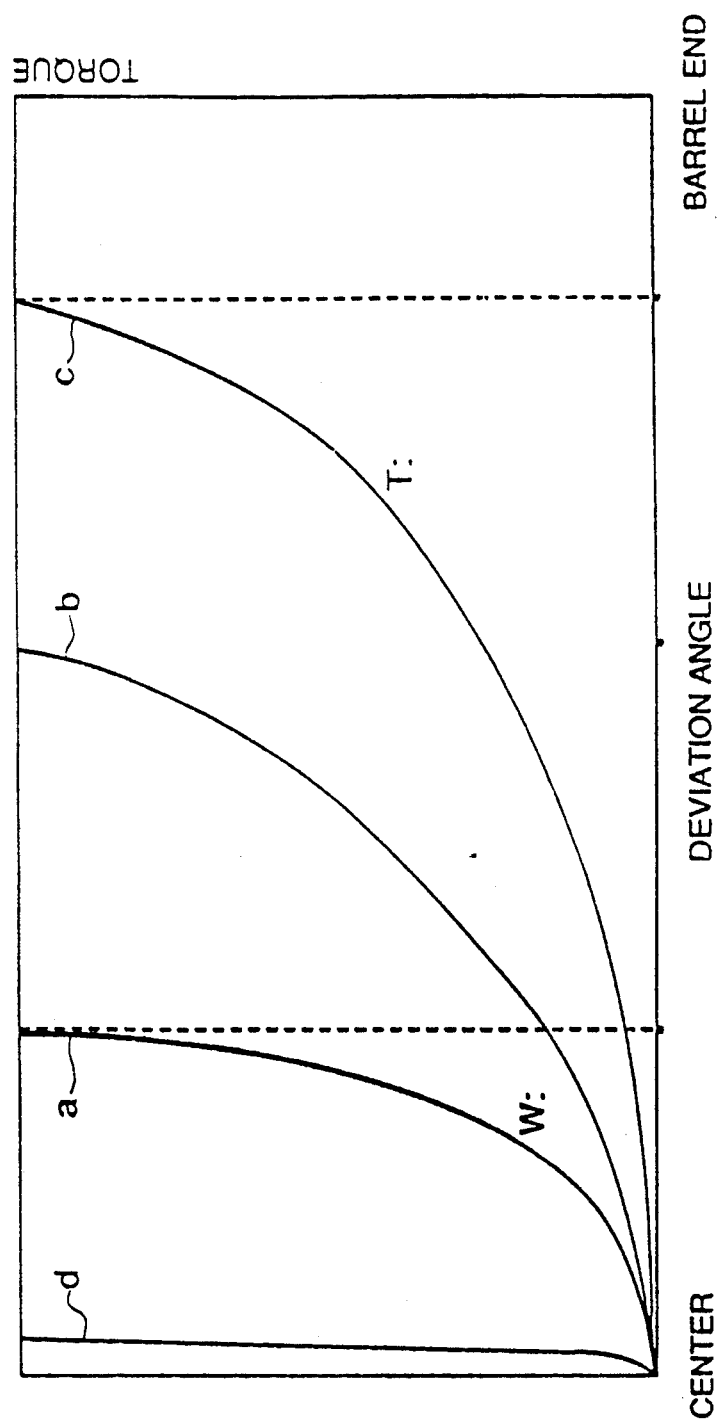
FIG. 14 is a control torque characteristic view showing a case in which the characteristics of the control torque are changed based upon the focal point in the present embodiment.

In this example, the above-mentioned control torque is applied stronger at a wide angle time than at a telephoto time in response to the output of the variable power encoder (ENC 95). FIG. 14 shows this situation. As the focal length of the photographing optical system changes from the telephoto (long focal length) end to the wide (short focal length) end, the control torque curve is changed as follows: (c)→(b)→(a), so that it has non-linear characteristics whereby a stronger torque can be given.

For this reason, set within the control circuit 50 are coefficients $K_1$ and $K_2$ for the above control function proportional to the deviation angle $\theta$ of the movable support member 3 for providing the LUTs 516 and 517 with a wide angle end torque curve a and coefficients $K_1$ and $K_2$ proportional to the deviation and $\theta$ of the movable support member 3 for providing with a telephoto end torque curve c. These coefficients are selected on the basis of the deviation angle $\theta$ of the movable support member 3. A synthetic computation is performed on these coefficients so that the torque curve described above can be obtained on the basis of the value of the NEC 95, and made to be coefficients $K_1$ and $K_2$ for the above control function.

This is a measure for preventing a large movement like a panning because it is known that a hand vibration is usually conspicuous in the hand-held telephoto photographing as compared with the wide angle photographing. The control torque, which is a negative effect for the primary purpose of stabilization, is made to deal with the situation in which the optical apparatus is used. The characteristics during telephoto photographing are made weaker than during wide angle photographing, so that they are suitable for the stabilization effect. As a result, the entire stabilization optical system can be compacted and made light in weight without degrading stabilization characteristics in the vicinity of the telephoto end being degraded. This point will now be explained briefly.

Figure 15A:
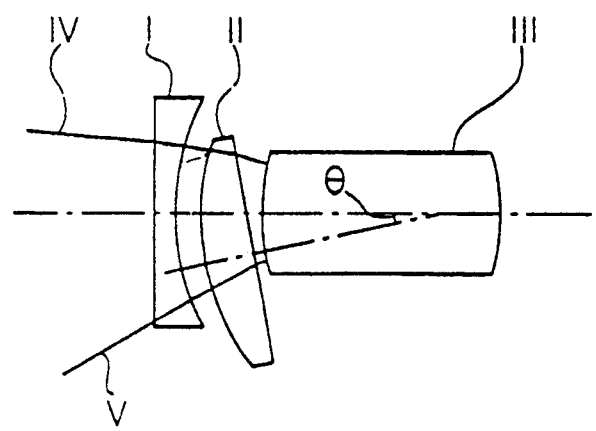
FIGS. 15(A) and (8) are optical constructional views showing that the apparatus of the embodiment in FIG. 4 can be miniaturized.

In FIGS. 15(A) and (B), reference characters I and II denote a first lens group and a second lens group of the comensatory optical system, respectively, which is the same as the lenses 1 and 2 shown in FIG. 4. Reference character III denotes the main photographing system; and reference characters IV and V each denote an off-axis light ray.

Figure 15B:
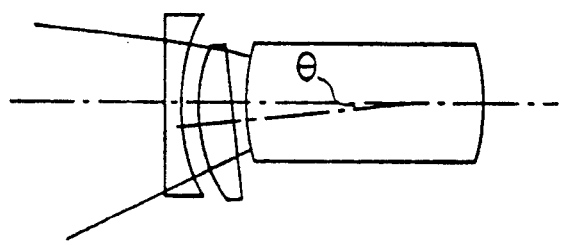

FIG. 15(A) shows a case in which the amount of deviation of the second group of stabilization is large; FIG. 15(B) shows a case in which the amount of deviation of the second group is small. The sizes of the lenses of the first and second lens groups for the stabilization optical system are determined respectively according to the heights at which off-axis light rays IV and V pass through the lens systems. Therefore, as shown in FIGS. 15(A) and (B), because the height at which off-axis light flux passes through when the deviation angle is small is lower than that when the deviation angle is large, the size of the optical system can be made small. The off-axis light ray which determines the size of the optical system is usually a light ray which forms an image at the maximum image height in the wide angle end or in the zoom area in the vicinity thereof.

If a light ray of a certain deviation angle is secured in the vicinity of the wide angle end (image blurring does not matter as much on the wide angle side as it does on the telephoto side), a sufficient stabilization range can be obtained because the angle of view becomes small in the vicinity of the telephoto end.

Therefore, if the deviation angle during stabilization in the vicinity of the wide angle end, i.e., the control range, is made smaller than that at the telephoto end on the basis of the torque characteristics as shown in FIG. 14, the entire stabilization optical system can be made small in size and light in weight without degrading the stabilization characteristics in the vicinity of the telephoto end (FIGS. 15(A) and 15(B)).

Control coefficients for electrically locking the movable support member 3 to the center of movement by performing torque control d shown in FIG. 14 are set in the LUTs 516 and 517 within the control circuit 50. Prior to the activation of the mechanical fixing means shown in FIGS. 5 and 6, the operation (hereinafter described as an electrical locking operation) is performed.

Next, the operation of the control system of FIG. 3 described above will be explained with reference to a flowchart of FIG. 16. The initial states of the control system are assumed as follows: the switch ASSW has been turned off, and the movable support member 3 is in a locked state by means of the mechanical fixing means, as shown in FIG. 5.

(Step 1) A check is made to determine whether or not the switch ASSW has been turned on. In response to the confirmation that the switch ASSW has been turned on, the process proceeds to step 2.

(Step 2) The positional information on the movable support member 3 in a locked state is read and it is retained in the reference data holder 512.

(Step 3) The unlocking operation is performed.

The details of this unlocking operation will now be explained with reference to the flowchart of FIG. 1.

(Step 3-1) The outputs of the sensor amplifiers 33x and 33y, which are proportional to the deviation angle $\theta$ about the x and y axes of the movable support member 3, are read from the A/D converter 511 as digital data. Reference data, which is positional information on the movable support member 3 in a locked state, retained in the above-mentioned step 2, is subtracted from this read digital data by the adder 513. On the basis of this subtracted data, a control function by which a control torque curve d shown in FIG. 14 can be obtained is read from the locking tables within the LUTs 516 and 517. The control torque data thus obtained is converted into analog data by the D/A converter 524. This data is then output to driving circuits 53x and 53y with the data assumed to be deviation angle data (a torque control signal). Thereupon, an electrical locking operation for positioning the movable support member 3 to the center of movement is performed.

The reason for performing the electrical locking operation is for the purpose of preventing the movable support member 3 from moving greatly due to an impact caused by the unlocking of the mechanical fixing means in subsequent steps. The reason for subtracting data retained by the reference data holder 512 from the output of the A/D converter 511 is for the purpose of preventing the deviation of a position of a picture image because the quality of the image becomes poor if the position at which the movable support member 3 is locked deviates from the position at which the movable support member 3 is unlocked. (Step 3-2) The motor 145 is rotated in a clockwise direction in FIG. 5 via the driving circuit 160.

When the motor 145 is rotated in a clockwise direction in this manner, the rotary member 140 is rotated in a clockwise direction beginning from the state in FIG. 5 while the coil springs 144a and 144b are being stretched in response to the driving of the motor 145, and the locking of the movable support member 3 is released. Thereafter, the switch 150 turns on at the same time the pawl section 148a of the locking member 148 enters the recess section 140b of the rotary member 140, and an operation of releasing the locking made by the mechanical fixing means is terminated (the state in FIG. 6).

(Step 3-3) A check is made to determine whether or not the operation of releasing the locking made by the mechanical fixing means has been terminated on the basis of the status of the switch 150. As described above, in response to the switch 150 turning on, the process proceeds to step 3-4.

(Step 3-4) The driving of the motor 145 is stopped.

(Step 3-5) The electrical locking operation is stopped.

Figure 16:
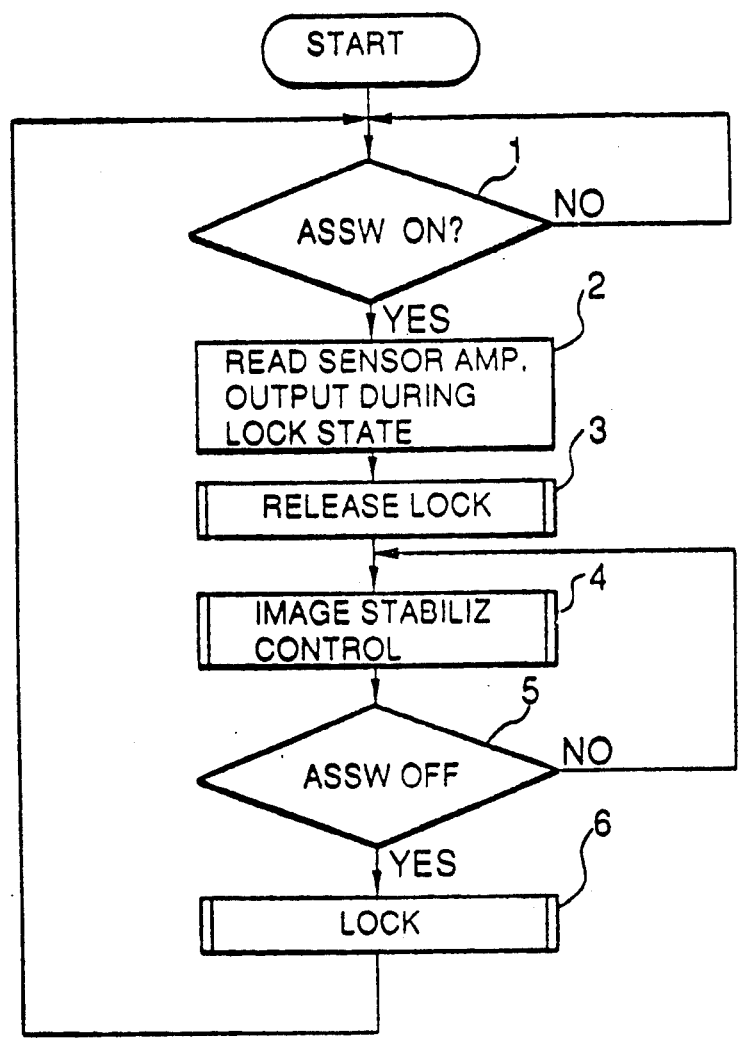
FIG. 16 is a main flowchart of the control system of FIG. 3.

When the above operations are terminated, the process returns to the main routine in FIG. 16 where the operations beginning with step 4 are started. (Step 4) Since the switch ASSW is on, stabilization control is started.

Figure 17:
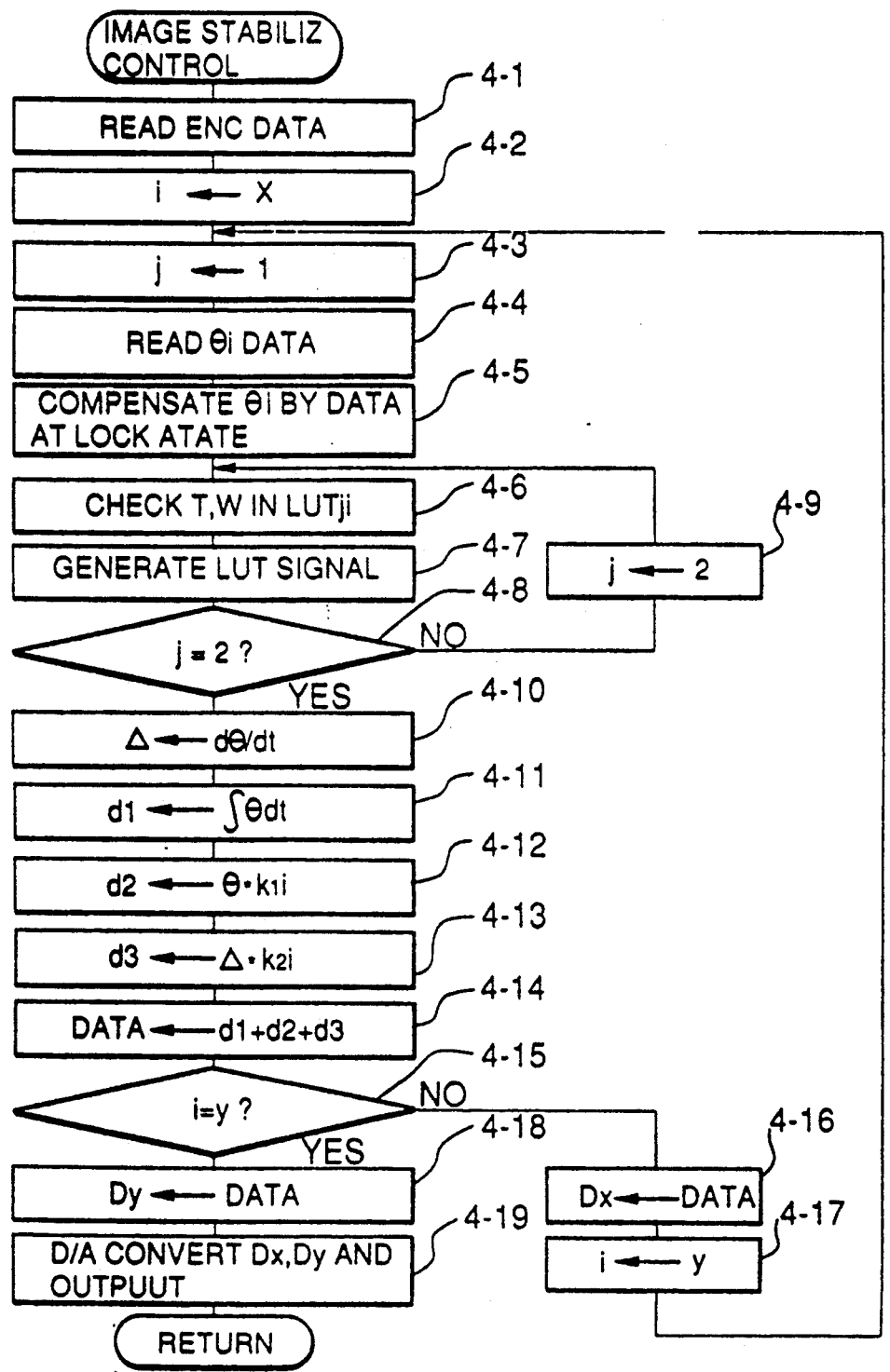
FIG. 17 is a flowchart showing a subroutine for the stabilization control shown in FIG. 16.

The details of this stabilization control will now be explained with reference to a flowchart in FIG. 17.

(Step 4-1) The value of the ENC 95 (ENC data) is read to detect the focal length.

(Step 4-2) Mode i is specified as x for a process in which a control torque signal about the x axis of the movable support member 3 is computed.

(Step 4-3) A LUT selection mode j is set to 1, and a selection is made of LUT where coefficients of the above control function are memorized.

(Step 4-4) The output of the sensor amplifier 33x which is proportional to the deviation angle $\theta$ (hereinafter referred to as $\theta x$) about the x axis of the movable support member 3, is read from the A/D converter 511 as digital data.

(Step 4-5) Reference data, which is positional information on the movable support member 3 in a locked state, retained in the above-mentioned step 2, is subtracted from this read digital data by the adder 513 and output to a subsequent step. The reason for performing such a computation is for the purpose of preventing the deviation of a position of a picture image, because the quality of the image becomes poor if the position at which the movable support member 3 is locked deviates from the position at which the movable support member 3 is unlocked. More specifically, for example, when the apparatus was incorporated into a camera, the camera is used in a locked state when a fast moving object is traced, because a sufficient stabilization effect can not be obtained. Thereafter, in a case where a shift is made again to a photographing in which stabilization control is effected, the above-mentioned problem arises. However, such a problem can be solved by rendering the position at which the camera is locked by the mechanical fixing means to be a reference as in the present embodiment. (Step 4-6) Based on the setting of the LUT selection mode j=1 in step 4-3, coefficients $K_{1W}$ and $K_{1T}$ corresponding to the above-mentioned deviation angle $\theta x$ are read from LUT-1x-W and LUT-1x-T in which the above-mentioned coefficient $K_1$ is memorized by which the control torque curve a at a wide angle end time and the control torque curve c at a telephoto end time about the x axis of the movable support member 3 shown in FIG. 14 can be obtained.

(Step 4-7) The above-mentioned coefficient $K_1$ of the control function for the current focal length is determined from the synthetic computation on the basis of the value of the ENC 95 for the above-mentioned coefficients $K_{1W}$ and $K_{1T}$.

Figure 18:
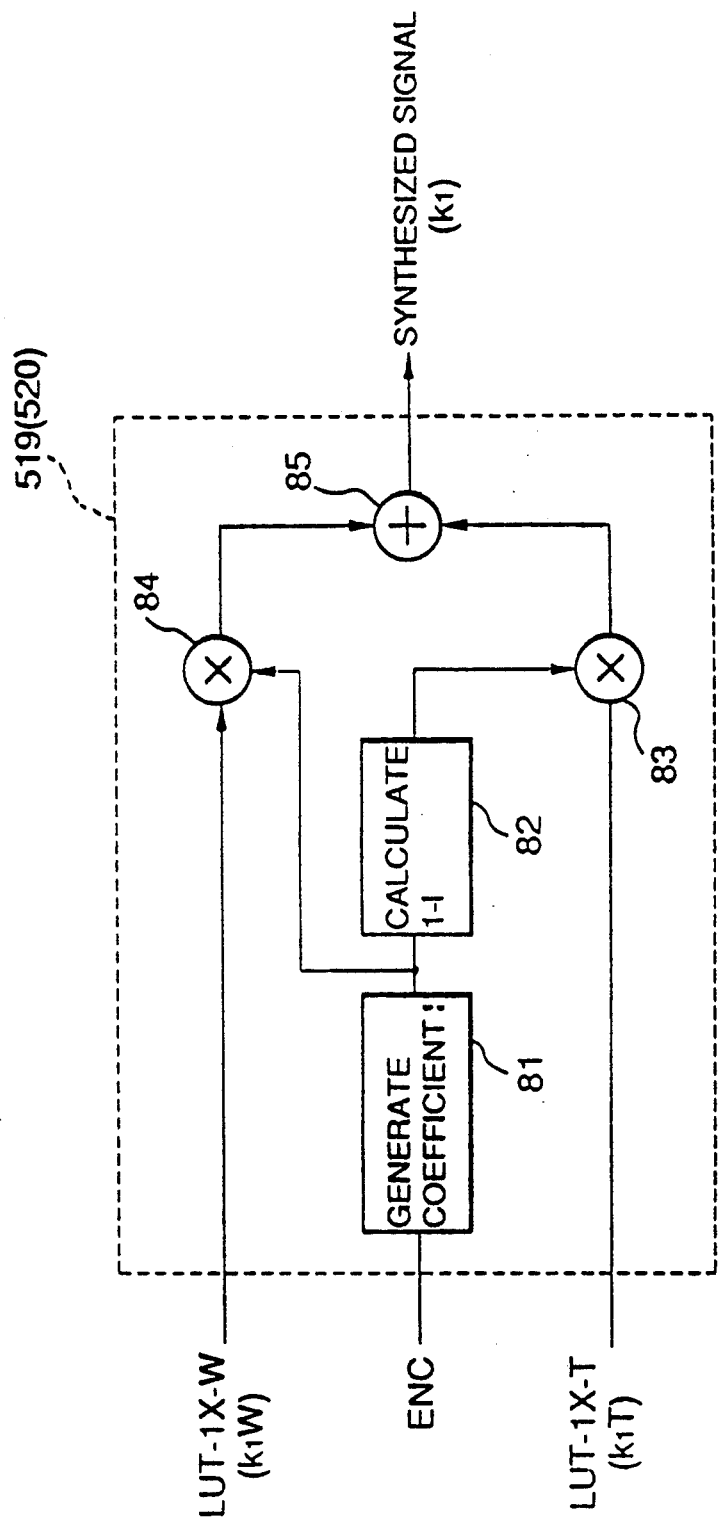
FIG. 18 is a circuit diagram showing a specific construction of a synthesizer shown in FIG. 3.

An example of this synthetic computation is shown in FIG. 18 in the form of hardware.

In FIG. 18, a synthesizer 519 (a synthesizer 520 alike) has a coefficient generator 81 for generating a coefficient l proportional to the resolution of the ENC 95, a computing unit 82 for generating a ones compliment $(1-l)$, and multipliers 84 and 83 for multiplying "$K_{1T} * l$" and "$K_{1W} * (1-l)$". It outputs a coefficient $K_1$ proportional to the focal length by means of the adder 85 for adding the output of the multiplier.

LUTs, the number of which is the same as the number of steps (resolution of the ENC, which correspond to the output of the ENC 95), may be prepared to omit this synthesizer.

(Step 4-8) For the setting of the LUT selection mode=1 or 2, a check is made to determine whether the processing for both settings has been terminated. When it has not been terminated (j=2), the process proceeds to step 4-9.

(Step 4-9) A resetting of the LUT selection mode j=2 is made, and the process returns to step 4-6. Based on the setting of the LUT selection mode j=2, coefficients $K_{2W}$ and $K_{2T}$ corresponding to the above-mentioned deviation angle $\theta x$ are read from LUT-2x-W and LUT-2x-T in which the above-mentioned coeffieint $K_2$ memorized by which can be obtained the control torque curve a at a wide angle end time and the control torque curve c at a telephoto end time about the x axis of the movable support member 3 shown in FIG. 14. Then, the coefficient $K_2$ of the control function is determined in step 4-7 from the above-mentioned synthetic computation.

(Step 4-10) The above-mentioned deviation angle $\theta x$ is differentiated ($d\theta x/dt$) and represented as data $\Delta$.

(Step 4-11) The deviation angle $\theta x$ is integrated ($\int \theta x dt$). This is multiplied by a coefficient $K_3$ and represented as data d1.

The coefficient $K_3$, as described above, is a small fixed value so as to set a small degree of influence on the control system. A non-linear processing as for the other coefficients $K_1$ and $K_2$ is not performed on the coefficient $K_3$.

(Step 4-12) The deviation angle $\theta x$ is multiplied by the coefficient $K_1$ determined earlier and represented as data d2.

(Step 4-13) The data $\Delta$ is multiplied by the coefficient $K_2$ determined earlier and represented as data d3.

(Step 4-14) The data d1, d2, and d3 are added and stored temporarily. This is represented as "DATA".

That is, the computation result of the above-mentioned control function can be obtained from the following equation:

$$\begin{aligned} DATA &= d1 + d2 + d3 \\ &= K_1 * \theta x + K_2 * d\theta x/dt + K_3 * \int \theta x dt. \end{aligned}$$

(Step 4-15) A check is made to determine whether the current processing mode i is about the x axis of the movable support member 3.

If the mode i is an odd number of times, it is about the x axis (in the case of "NO"), the process proceeds to step 4-16; if the mode i is an even number of times, it is about the y axis (in the case of "YES"), the process proceeds to step 4-18.

(Step 4-16) The computation result, "DATA", is assumed to be control torque data about the x axis and stored in Dx.

(Step 4-17) The processing mode i is changed to y, and the process returns to step 4-3. Next, a process in which a control torque signal about the y axis of the movable support member 3 is computed is performed similarly to the case about the x axis.

In this case, however, in step 4-6, coefficients $K_{1W}$ and $K_{1T}$ corresponding to the above-mentioned deviation angle $\theta$ (hereinafter referred to as $\theta y$) are read from LUT-1x-W and LUT-1x-T in which the above-mentioned coefficient $K_1$ is memorized by which can be obtained the control torque curve a at a wide angle end time and the control torque curve c at a telephoto end time about the x axis of the movable support member 3 shown in FIG. 14. Also, coefficients $K_{1W}$ and $K_{1T}$ corresponding to the above-mentioned deviation angle $\theta y$ are read from LUT-1x-W and LUT-1x-T in which the above-mentioned coefficient $K_2$ is memorized by which can be obtained the control torque curve a at a wide angle end time and the control torque curve c at a telephoto end time about the x axis of the movable support member 3 shown in FIG. 14.

(Step 4-18) The computation result, "DATA", is assumed to be control torque data about the y axis and stored in Dy.

(Step 4-19) The control torque data Dx and Dy are converted into analog data by the D/A converter 524. This is assumed to be a torque control signal and output to the driving circuits 53x and 53y. Thereupon, torque control about the x axis of the movable support member 3 is performed.

A torque is generated which sharply increases non-linearly for returning the movable support member 3 to the center of movement in the torque generation system (41x, 42x) about the x axis and in the torque generation system (41y, 42y) about the y axis as the movable support member 3 comes closes to the inner wall of the barrel 4 by a panning or tilting operation according to the torque curve of the above-mentioned control function. As a result, a strong torque is provided as the focal length comes from the telephoto side to the wide angle side. As a result, the movable support member 3 is effectively returned to the center of movement.

When the above operations are terminated, the process returns to the main routine in FIG. 16 and proceeds to step 5.

(Step 5) A check is made to determine whether the switch ASSW has been turned off. If it has not been turned off, the stabilization control is continued. In response to the confirmation of the switch being turned off, the process proceeds to step 6.

(Step 6) A locking operation is performed.

The details of this locking operation will now be explained with reference to the flowchart in FIG. 2.

(Step 6-1) A control function by which a control torque curve d shown in FIG. 14 can be obtained is read from the locking tables within LUTs 516 and 517 on the basis of the data in which the data of the reference data holder 512 is subtracted from the data of the A/D converter 511 in the same manner as in step 3-1. An electrical locking operation is performed on the basis of the control torque data thus obtained.

The reason for performing such an electrical locking operation is for the purpose of locking smoothly by means of the mechanical fixing means in subsequent steps. That is, there is a danger that a large shock is caused in the movable support member 3 when the locking operation is started by means of the mechanical fixing means in a state in which the movable support member 3 has a certain deviation angle.

(Step 6-2) To start a locking operation by means of the mechanical fixing means, the motor 145 is rotated in a counterclockwise direction via the driving circuit 160.

Figure 7:
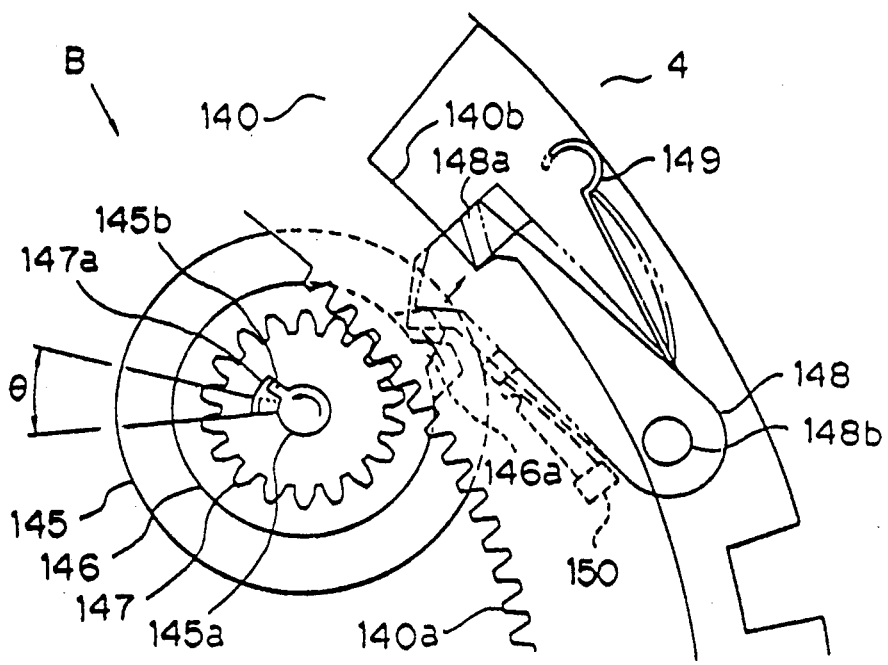
FIG. 7 is a view in which the vicinity of a motor shown in FIG. 6 is enlarged.
Figure 8:
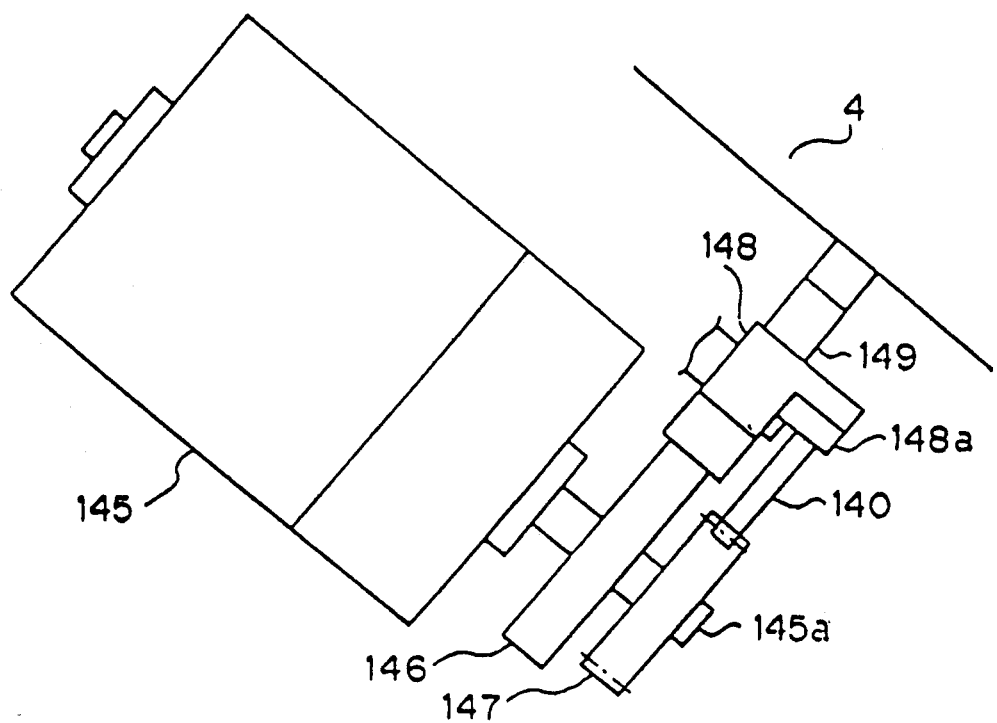
FIG. 8 is a view seen from the direction of B in FIG. 7.

A description will be provided of the operation at this time with reference to FIGS. 7 and 8. FIG. 7 is an enlarged view showing the vicinity of the motor 145 in FIG. 6; FIG. 8 is a view showing a case in which the motor 145 is seen from the direction of B in FIG. 7.

When the motor 145 is rotated in a counterclockwise direction as described above, the gear 147 is also rotated in a counterclockwise direction because a projection 145b disposed on the output shaft 145a of the motor 145 engages with a groove 147a disposed on the gear 147. There is a clearance of an angle of $\theta$ between the groove 147a and the projection 145b, as shown in the figure. It becomes possible for only the output shaft 145a to rotate through $\theta$ in a counterclockwise direction from the state shown in FIG. 6 (unlocked state). This rotation causes the disc 146 fixed to the output shaft 145a to rotate. The projection 146a of the disc 146 causes the locking member 148 to leap up and the pawl section 148a is detached from the recess section 140b of the rotary member 140. The rotary member 140 rotates until it is brought into abutment with the stopper 4a in accordance with the energizing of the coil springs 144a and 144b and enters a locked state shown in FIG. 5 in due course of time.

(Step 6-3) "N" is substituted for a timer Vt. This "N" is a time period sufficient for the time in which the output shaft 145a rotates through $\theta$ in a counterclockwise direction, the projection 146a causes the locking member 148 to leap up, and the pawl section 148a is detached from the recess section 140b of the rotary member 140.

(Step 6-4) The value of the timer Vt is decreased by 1.

(Step 6-5) A check is made to determine whether the value of the timer Vt has reached "0". In response to the confirmation that the value of the timer Vt has reached "0", the process proceeds to step 6-6.

(Step 6-6) The driving of the motor 145 is stopped.

(Step 6-7) The above-mentioned electrical locking operation is released.

When the above operations are terminated, the process returns to the main routine in FIG. 16 beginning with step 1.

The locking of the movable support member 3 is performed by the control circuit 50. In an actual use, however, the following situation described below in which the power disappears when the switch ASSW is on (in an unlocked state) can be considered:

① The power-supply switch is suddenly turned off.
② The power-supply voltage falls below a circuit operation guaranteed voltage.
③ An electric battery, which is a power supply, is detached (intentionally or mistakenly).

In such a case described above, because the control circuit 50 stops functioning, the motor 145 must be driven in a counterclockwise direction without using the control circuit 50 to lock the movable support member 3.

The driving circuit 160, the details of which are shown in FIG. 13, has functions to deal with such cases as described above. When the power disappears due to any of the above reasons, the transistor Tr is turned on. The input 1 (in1) of the driving section DR becomes a high level. The motor 145 is driven in a counterclockwise direction until the capacity C is completely discharged. As a consequence, the locking member 148 is made to leap up, as described earlier. The movable support member 3 is reliably locked by the energizing of the coil springs 144a and 144b.

Figure 1:
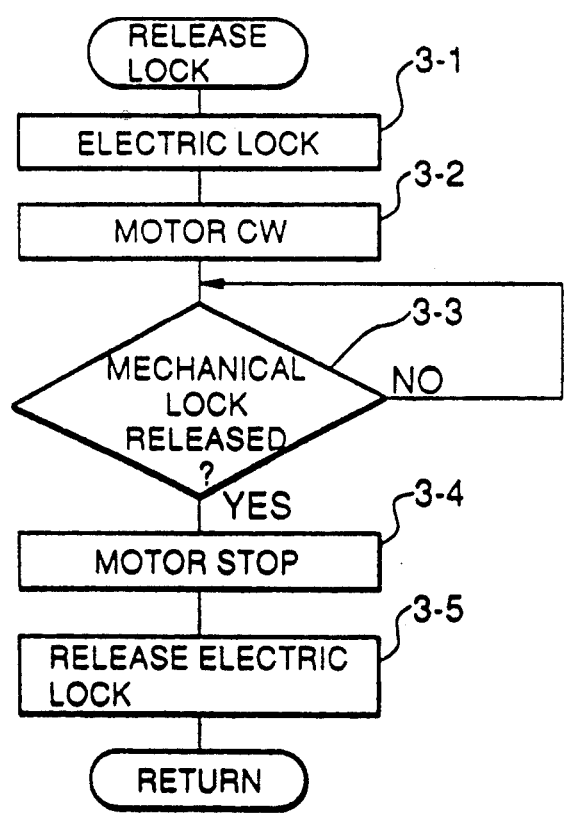
FIGS. 1 and 2 are each a flowchart showing the essential portion of the operation of a control system shown in FIG. 3.
Figure 2:
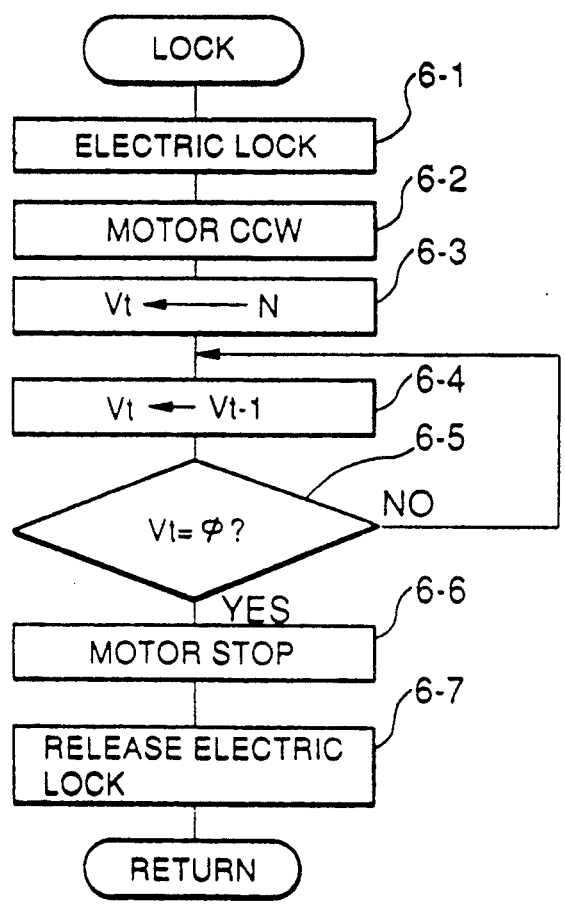

As has been explained above, according to the present embodiment, since the locking or unlocking of the movable support member 3 is started in a state in which it is brought into the center of movement by performing an electrical locking operation as shown in FIGS. 1 and 2, the above-mentioned operation can be performed smoothly and no distortion of a picture image occurs. Also, the movable support member 3 can be prevented from being deformed or damaged when the movable support member 3 strikes the barrel 4.

In addition, according to the present embodiment, the movable support member 3 can be locked by a capacitor C having such a small capacity as to be able to drive the motor 145 for a time period in which the projection 146a of the disc 146 causes the locking member 148 to leap up and the pawl 148a to be detached from the groove 14b of the rotary member 140. Thereafter, a locking operation is performed by using the coil springs 144a and 144b charged at an unlocking time. Therefore, an apparatus which is small in size and low in cost can be obtained, and the movable support member 3 can reliably be locked.

Many different embodiments of the present invention may be constructed without departing from the spirit and scope of the present invention. It should be understood that the present invention is not limited to the specific embodiments described in this specification, except as defined in the appended claims.

We claim:

1. An image stabilizing apparatus which compensates image blurring by means of a compensatory optical system displaceably supported relative to a barrel, comprising:
   (A) electrical locking means for electrically locking the compensatory optical means relative to the barrel;
   (B) mechanical locking means for mechanically locking the compensatory optical means relative to the barrel; and
   (C) control means for activating the electrical locking means prior to the activation or releasing of the mechanical locking means.

2. The apparatus according to claim 1, wherein the electrical locking means includes driving means for moving the compensatory optical means to a predetermined position relative to the barrel.

3. The apparatus according to claim 2, wherein the driving means includes means for generating an electromagnetic driving force.

4. The apparatus according to claim 1, wherein the electrical locking means includes driving means for moving the compensatory optical means to a position at which it is locked by the mechanical locking means.

5. The apparatus according to claim 4, wherein the driving means includes means for generating an electromagnetic driving force.

6. The apparatus according to claim 1, wherein the electrical locking means includes means for generating an electromagnetic driving force.

7. The apparatus according to claim 1, further comprising detection means for detecting a position at which the mechanical locking means locks the compensatory optical means.

8. The apparatus according to claim 7, wherein the electrical locking means includes means which operates with the output of the detection means being as a reference.

9. The apparatus according to claim 1, wherein the control means includes means for terminating the activation of the electrical locking means after the activation or releasing of the mechanical locking means is terminated.

10. The apparatus according to claim 1, wherein the electrical locking means includes means for locking the compensatory optical means without contact.

11. The apparatus according to claim 1, wherein the electrical locking means includes means for generating a driving force, which increases as the compensatory optical means is always farther from a predetermined position, for moving the compensatory optical means to the predetermined position relative to the barrel.

12. The apparatus according to claim 11, wherein the driving means includes means for driving the compensatory optical means without contact.

13. The apparatus according to claim 11, wherein the driving means includes means for generating a non-linear driving force at the position of the compensatory optical means.

14. The apparatus according to claim 1, wherein the mechanical locking means includes a motor.

15. The apparatus according to claim 7, further comprising activation means for controlling the image stabilization characteristics of the compensatory optical means, which activation means operating with the output of the detection means being as a reference 16. The apparatus according to claim 1, further comprising:
   elastic means for energizing the mechanical locking means in a direction of the activation; and
   maintaining means for maintaining the mechanical locking means in a non-activation state in opposition to the energization force of the elastic means, the maintaining means being released when the power disappears.

* * * * *